United States Patent [19]
Cho

[11] Patent Number: 5,995,593
[45] Date of Patent: Nov. 30, 1999

[54] WIRE/WIRELESS COMMUNICATION SYSTEM FOR COMMUNICATING BETWEEN TWO LOCATIONS USING TELEPHONE NETWORK

[75] Inventor: Han-Jin Cho, Seoul, Rep. of Korea

[73] Assignee: SamSung Electronics Co., Ltd., Kyungki-do, Rep. of Korea

[21] Appl. No.: 08/841,604

[22] Filed: Apr. 30, 1997

[30] Foreign Application Priority Data

Apr. 30, 1996 [KR] Rep. of Korea ........................ 96/13658

[51] Int. Cl.$^6$ .............................. H04M 11/00; H04B 1/38
[52] U.S. Cl. ............................ 379/56.3; 455/556; 455/90
[58] Field of Search ..................................... 379/FOR 101, 379/56.2, 56.3, 56.1; 455/90, 575, 556, 558; 359/172, 118, 149

[56] References Cited

U.S. PATENT DOCUMENTS

| | | | |
|---|---|---|---|
| 4,456,793 | 6/1984 | Baker et al. | 379/56.3 |
| 4,490,584 | 12/1984 | Lucey | 379/56.3 |
| 4,553,267 | 11/1985 | Crimins | 379/56.3 |
| 4,754,473 | 6/1988 | Edwards | 379/56.3 |
| 4,775,996 | 10/1988 | Emerson et al. | 379/56.3 |
| 4,776,000 | 10/1988 | Parienti | 379/56.3 |
| 5,068,916 | 11/1991 | Harrison et al. | 455/39 |
| 5,099,346 | 3/1992 | Lee et al. | 359/118 |
| 5,255,111 | 10/1993 | Kwa | 359/113 |
| 5,301,353 | 4/1994 | Borras et al. | 485/9 |
| 5,321,542 | 6/1994 | Freitas et al. | 359/172 |
| 5,364,108 | 11/1994 | Esnouf | 273/430 |
| 5,469,283 | 11/1995 | Vinel et al. | 359/118 |
| 5,517,608 | 5/1996 | Suzuki et al. | 359/161 |
| 5,602,665 | 2/1997 | Asako | 359/152 |
| 5,835,862 | 11/1998 | Nykanen et al. | 379/56.3 |

Primary Examiner—Reinhard J. Eisenzopf
Assistant Examiner—Edan Orgad
Attorney, Agent, or Firm—Robert E. Bushnell, Esq.

[57] ABSTRACT

A wire/wireless communication system includes two units for wire/wireless communication of information using a telephone network between two locations which are far away from each other. One of the two units is a data transmitting unit, such as a computer terminal, which is positioned at a first location and the other is a data receiving unit. To the units, infrared transceivers are coupled to transmit information as infrared radiation and receive the infrared radiation. Also, to the data transmitting and receiving units, telephones are connected. These telephones are interconnected by the telephone network therebetween and are respectively connected to transceivers. Wireless communication between the computer terminal of the data transmitting unit and the telephone which are positioned at the first location may be accomplished by the transceivers respectively coupled to them. The electrical signal corresponding to the information from the computer terminal is supplied through the telephone network to the telephone which is positioned adjacent to the computer terminal at the second location.

17 Claims, 7 Drawing Sheets

WIRE/WIRELESS COMMUNICATION SYSTEM FOR COMMUNICATING BETWEEN TWO LOCATIONS USING TELEPHONE NETWORK

CLAIM OF PRIORITY

This application makes reference to, incorporates the same herein, and claims all benefits accruing under 35 U.S.C. §119 from an application for WIRE/WIRELESS COMMUNICATION SYSTEM BETWEEN TWO LOCATIONS USING TELEPHONE NETWORK earlier filed in the Korean Industrial Property Office on the 30$^{th}$ day of Apr. 1996 and there duly assigned Ser. No. 13658/1996, a copy of which application is annexed hereto.

FIELD OF THE INVENTION

The present invention relates to a wire/wireless communication system for communicating between two locations using a telephone network and, more particularly to, an apparatus for wire/wireless communication of information using a telephone network and infrared radiation between two locations which are far away from each other.

BACKGROUND OF THE INVENTION

In general, wire data communication between two terminals is accomplished by using a data modem embodied in each of the terminals or by using a LAN (local area network) system. Particularly, a data modem is provided to support data-communication between personal computers. A typical personal computer is capable of supporting a variety of computer communication techniques such as serial communication using a serial port of an input/output device, parallel communication using a parallel port, LAN (local area network) communication using a LAN network system and the like.

Also wireless data communication between a plurality of pieces of computer equipment including computers, computer terminals, scanners, computer peripherals and the like, may be accomplished by a sort of radio receiver called a pager, or wireless communication modules which are positioned at both locations.

Since data communication between a computer terminal and an associated computer peripheral may be accomplished only within a cable connection range or an infrared radiation range, it cannot be accomplished if the computer terminal and the peripheral are located beyond the range of infrared radiation from each other.

Both the Harrison et al. and Freitas et al. patents, U.S. Pat. Nos. 5,068,916 and 5,321,542, respectively entitled Coordination Of Wireless Medium Among A Plurality Of Base Stations, and Control Method And Apparatus For Wireless Data Link, disclose arrangements for connecting mobile units to a base station through infrared radiation channels and then connecting the base station to other stations through a wired LAN.

The following additional patents each disclose features in common with the present invention but are not as pertinent as the references noted above.

U.S. Pat. No. 5,099,346 to Lee et al., entitled Infrared Communications Network, U.S. Pat. No. 5,469,283 to Vinel et al., entitled Optical System For connecting Customer Premises Networks To a Switching Center OF A Telecommunication Network Providing Interactive And Non-Interactive Services, U.S. Pat. No. 5,062,665 to Asako, entitled Optical Transmitting/Receiving Apparatus For Bidirectional Communication Systems, U.S. Pat. No. 5,517,608 to Suzuki et al., entitled Communication Apparatus And Method U.S. Pat. No. 5,301,353 to Borras et al., entitled Communication system And Apparatus, and U.S. Pat. No. 5,255,111 to Kwa, entitled Full-Duplex Optical Transmission System.

SUMMARY OF THE INVENTION

It is therefore an object of the present invention to provide an apparatus for effecting wireless communication using a telephone network between two locations which are positioned far away from each other.

According to an aspect of the present invention, a system is provided for wire/wireless communication of information using a telephone network disposed between two locations which are far away from each other. The system comprises a data transmitting unit positioned at a first of said locations, for transmitting information; a first transceiver coupled to said data transmitting unit, for transforming said information into a first infrared signal; a first telephone positioned at said first location; a second transceiver coupled to said first telephone, for receiving said first infrared signal from said first transceiver and transforming said first infrared signal into an electrical signal to be supplied to said telephone network; a second telephone positioned at a second location and connected to said telephone network; a third transceiver coupled to said second telephone, for receiving said electrical signal over a telephone line of said telephone network and transforming said electrical signal into a second infrared signal; a fourth transceiver for receiving said second infrared signal and transforming said second infrared signal into said electrical signal; and a data receiving unit positioned at said second location and coupled to said fourth transceiver, for receiving said electrical signal and transforming said information.

Each of said first and third transceivers comprises a first infrared baseband modem for transforming said information into analog form necessary for telephone line transmission; a transmitter means for transforming an analog signal from said first infrared baseband modem into an infrared signal; and a first infrared antenna for transmitting said infrared signal as infrared radiation.

Each of said second and fourth transceivers comprises a second infrared antenna for transforming said infrared radiation into said infrared signal; a receiver means for receiving and converting said infrared signal into said analog signal; and a second infrared baseband modem for receiving and converting said analog signal into said analog form necessary for telephone line transmission.

According to another aspect of the present invention, a control method of a system for wire/wireless communication of information using a telephone network disposed between two locations which are far away from each other comprises the steps of: detecting a carrier signal which is provided through a first transceiver to a data transmitting unit; determining whether a first identifier of a data packet from a data receiving unit is identical with a second identifier of said data transmitting unit; if so, performing a modem control program in said first transceiver in response to a control signal from said data receiving unit; transforming said information from said data transmitting unit into a specific form required by said data receiving unit to generate a transformed signal; encoding said transformed signal into an analog signal necessary for infrared radiation; transmitting said analog signal as infrared radiation; determining whether an acknowledge signal is provided from said data receiving unit; if so, changing a data communication mode into a standby mode to detect a control signal from said data receiving unit, or, if not, continuously transmitting said analog signal as infrared radiation; and clearing said received data packet, if said identifier of a data packet from said data receiving unit is not identical with said identifier of said data transmitting unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
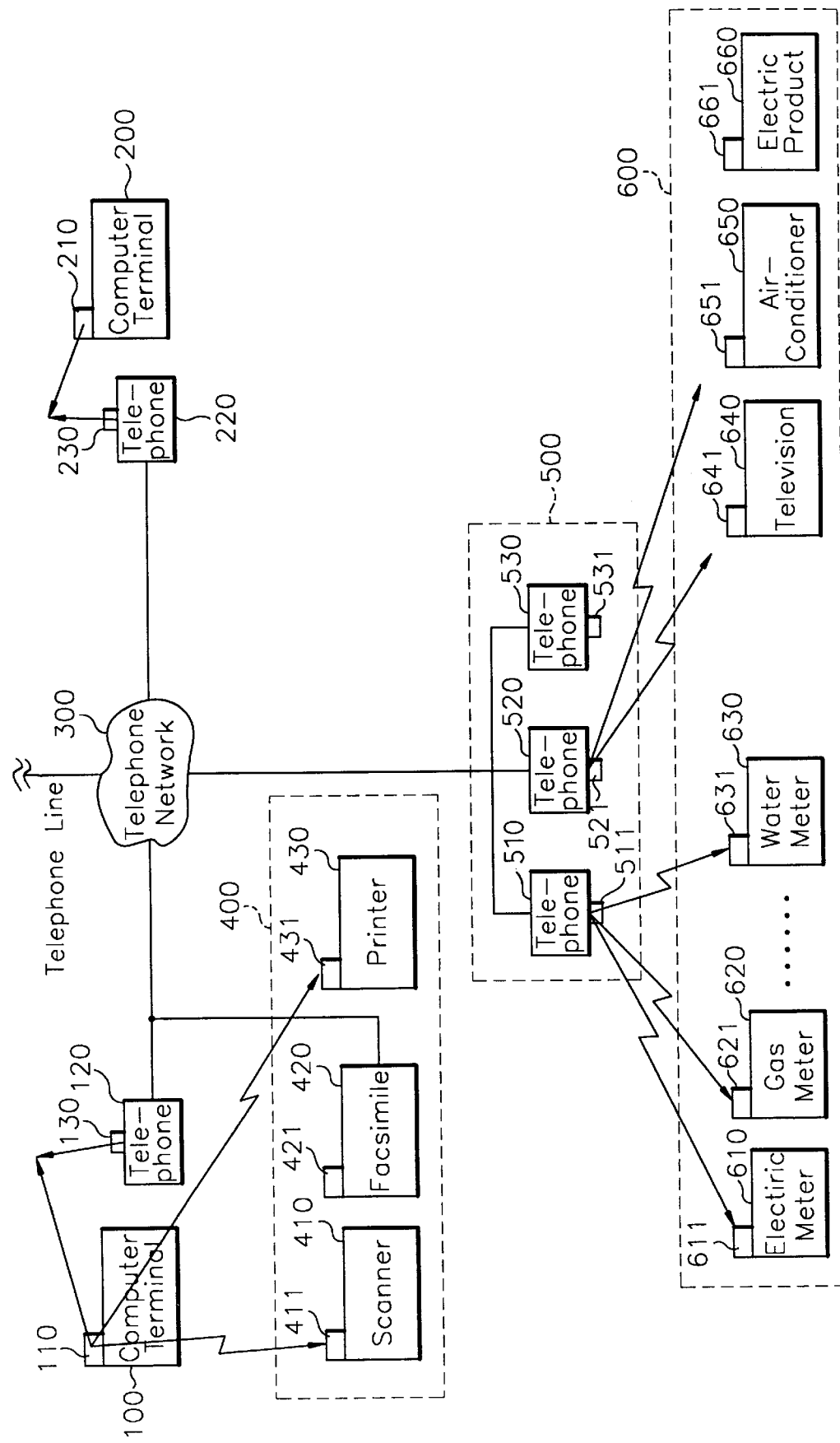
FIG. 1 is a control system diagram of a wire/wireless communication system in which a wireless communication apparatus using a telephone network according to the present invention is incorporated.

Referred to FIG. 1, a novel wire/wireless communication system in accordance with a first embodiment of the present invention comprises two units 100 and 200 for wire/wireless communication of information using a telephone network 300 disposed between two locations which are far away from each other. One of the two units is a data transmitting unit 100, such as a computer terminal, which is positioned at a first location and the other unit is a data receiving unit 200, such as a computer terminal, a computer peripheral, an office automation device or the like, which is positioned at a second location. Infrared transceivers 110 and 210 are respectively coupled to the units 100 and 200 to convert and transmit information as infrared radiation and to receive and convert the infrared radiation. Also, telephones 120 and 220 are respectively connected to the data transmitting and receiving units 100 and 200. These telephones 120 and 220 are interconnected by the telephone network 300 disposed therebetween and are respectively connected to transceivers 130 and 230.

Wireless communication between the computer terminal 100 of the data transmitting unit and the telephone 120 which are positioned at the first location may be accomplished by the transceivers 110 and 130 respectively coupled to them. For example, information from the computer terminal 100 is provided to the transceiver 110 to be transformed into an infrared signal. This infrared signal is transmitted to the transceiver 130 connected to the telephone 120 and then received and converted into an electrical signal by means of the transceiver 130. This electrical signal, corresponding to the information from the computer terminal 100, is supplied through the telephone network 300 to the telephone 220 which is positioned adjacent to the computer terminal 200 at the second location. The communication of the electrical signal through the telephone network 300 is hereinafter called "a wire communication".

As described immediately above, the system of the present invention permits wire and wireless communication to be accomplished between the data transmitting and receiving units 100 and 200.

Referring again to FIG. 1, the computer terminal 100 having the transceiver 110 can wireless-communicate directly with computer peripherals 400 such as, a scanner 410, a facsimile machine 420, a printer 430 or the like. The computer peripherals 400 are respectively provided with infrared transceivers 411, 421 and 431. Wireless communication between the computer terminal 100 and the computer peripherals 400 can be accomplished by means of the transceivers respectively connected thereto.

Also, the computer terminal 100, having the transceiver 110, can communicate through the telephone network 300 with home automation equipment 600 such as, an electric meter 610, a gas meter 620, a water meter 630, television set 640, an air-conditioner 650, an electric product 660 and the like. A group of telephones 500 at another location are connected to the telephone network 300 and are respectively provided with transceivers 511, 521 and 531. As a result, a wire communication can be accomplished between the computer terminal 100 and a group of the telephones 500 and a wireless communication can be accomplished between the group of the telephones 500 and the home automation equipment 600.

Figure 2:
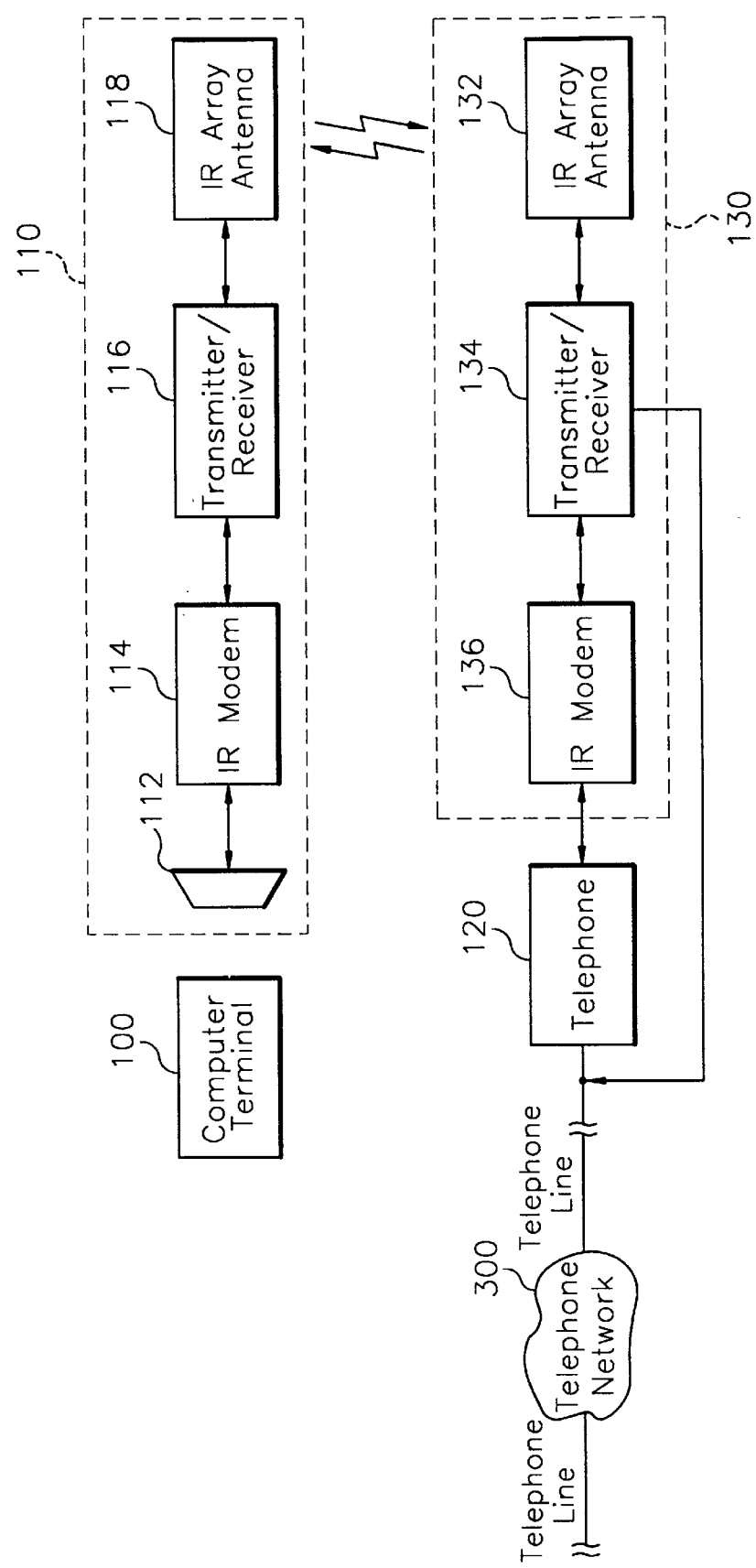
FIG. 2 is a detailed block diagram illustrating the connection of the transceivers which are respectively connected to a computer terminal shown in FIG. 1 and a telephone at a first location.

FIG. 2 is a detailed block diagram illustrating the connection of the transceivers which are respectively connected to a computer terminal and a telephone at a first location. Referring to FIG. 2, the transceiver 110, connected to the computer terminal 100 comprises four major sections, for example, a communication port 112, a first infrared (IR) baseband modem 114, a first infrared transmitter/receiver section 116 and a first infrared array antenna 118. The communication port 112 is provided to interface the computer terminal 100 with the infrared transceiver 110, and may be embodied in the computer terminal 100. The transceiver 130, connected to the telephone 120, comprises a second infrared array antenna 132, a second infrared transmitter/receiver 134 and a second IR baseband modem 136. In this case, the transceivers 110 and 130 have the same circuit construction. The infrared transmitter/receiver 116 of the transceiver 110 may be used only as an infrared transmitter when the information from the computer terminal 100 is only transmitted to the transceiver 130 in wireless form. The second infrared transmitter/receiver 134 may be used only as an infrared receiver when the transceiver 130 only receives the infrared radiation corresponding to the information from the computer terminal 100 and transforms it into an analog signal necessary for telephone line transmission.

Figure 3:
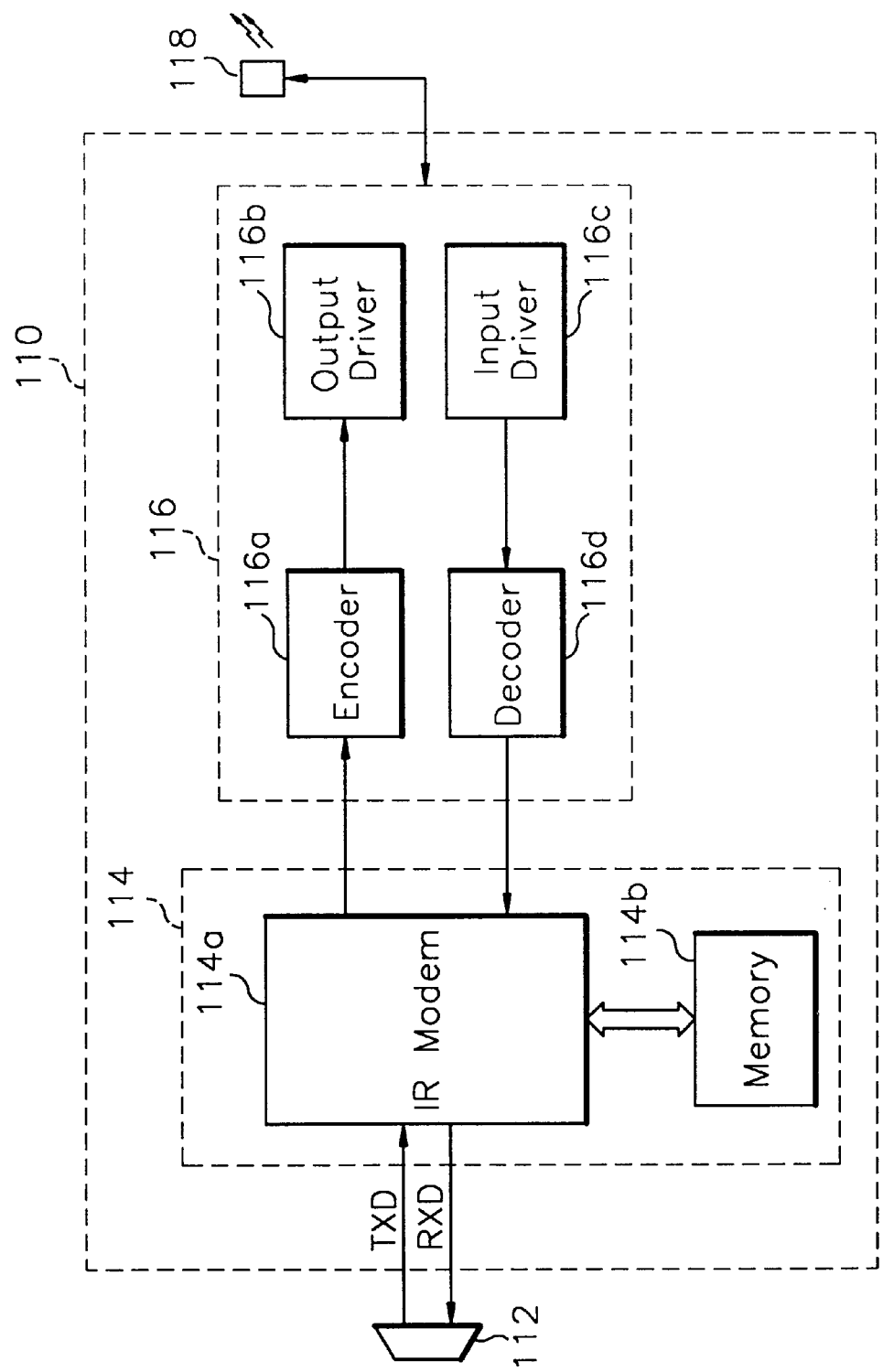
FIG. 3 is a detailed block diagram illustrating the transceiver of FIG. 2 connected to the computer terminal.

FIG. 3 illustrates the transceiver 110 shown in FIG. 2 which is connected to the computer terminal 100. The first IR baseband modem 114 of the transceiver 110 has, as shown in FIG. 3, a first infrared baseband modem 114a for transforming said information into analog form necessary for telephone line transmission and a first memory 114b in which several control programs necessary for modem control are stored. The transmitter/receiver 116 is provided to transform an analog signal from the modem 114a into an infrared signal and to transmit infrared radiation through the infrared array antenna 118.

The transmitter/receiver 116 comprises an encoder 116a and an output driver 116b. The encoder 116a is provided to transform the analog signal into a specific form, and the output driver 116b is provided to receive the analog signal encoded into said specific form to generate the infrared signal necessary for infrared radiation though the IR array antenna 118. The transmitter/receiver 116 further comprises, as shown in FIG. 3, an input driver 116c for transforming the infrared signal from the antenna 118 into an analog signal and a decoder 116d for decoding the analog signal into a specific form.

Figure 4:
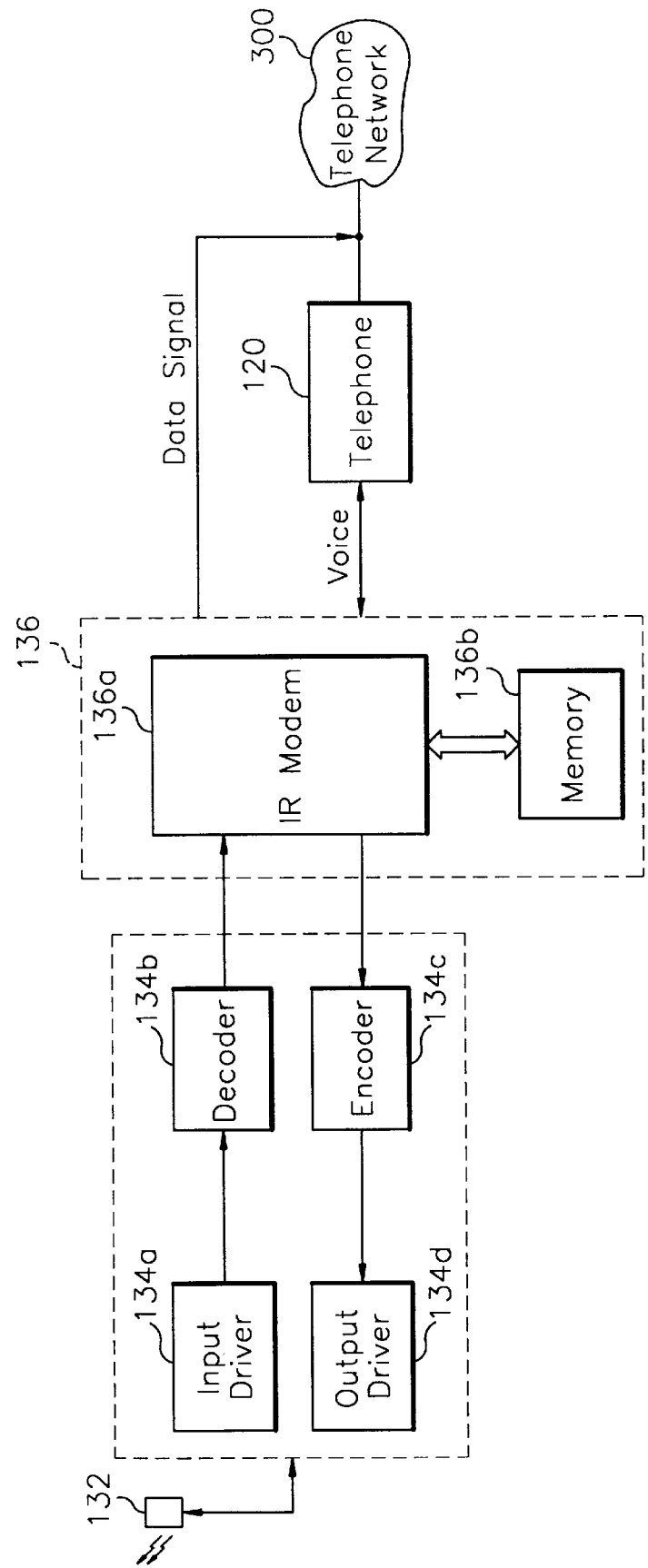
FIG. 4 is a detailed block diagram illustrating the transceiver of FIG. 2 connected to the telephone terminal.

FIG. 4 illustrates the transceiver 130 shown in FIG. 2 which is connected to the telephone 110. The transmitter/receiver 134 of the transceiver 130 comprises an input driver 134a and an decoder 134b. The input driver 134a is provided to transform the infrared signal from the antenna 132 into an analog signal and the decoder 134b is provided to decode the analog signal into a specific form. The second IR baseband modem 136 of the transceiver 130 has, as shown in FIG. 4, a second infrared baseband modem 136a for transforming the decoded analog signal in a specific form necessary for telephone line transmission, and a second memory 136b in which several control programs necessary for modem control are stored. The transmitter/receiver 134 further comprises, as shown in FIG. 4, an encoder 134c for transforming the analog signal into a specific form, and an output driver 134d for receiving the analog signal encoded into the specific form and for generating the infrared signal necessary for infrared radiation though the IR array antenna 132.

Figure 5:
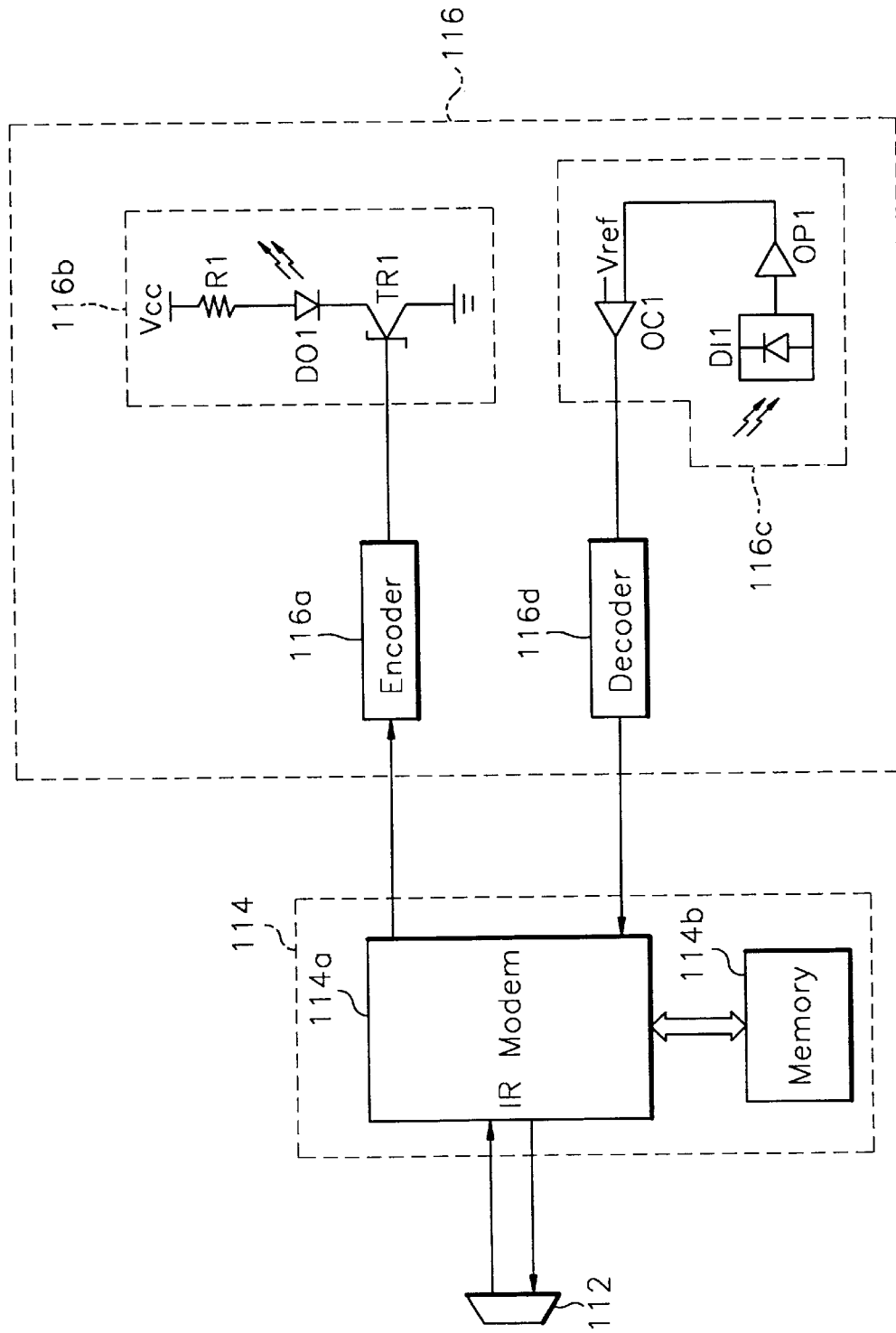
FIGS. 5 and 6 are detailed circuit diagrams illustrating the connection of the output and input drivers shown in FIG. 3 or FIG. 4.
Figure 6:
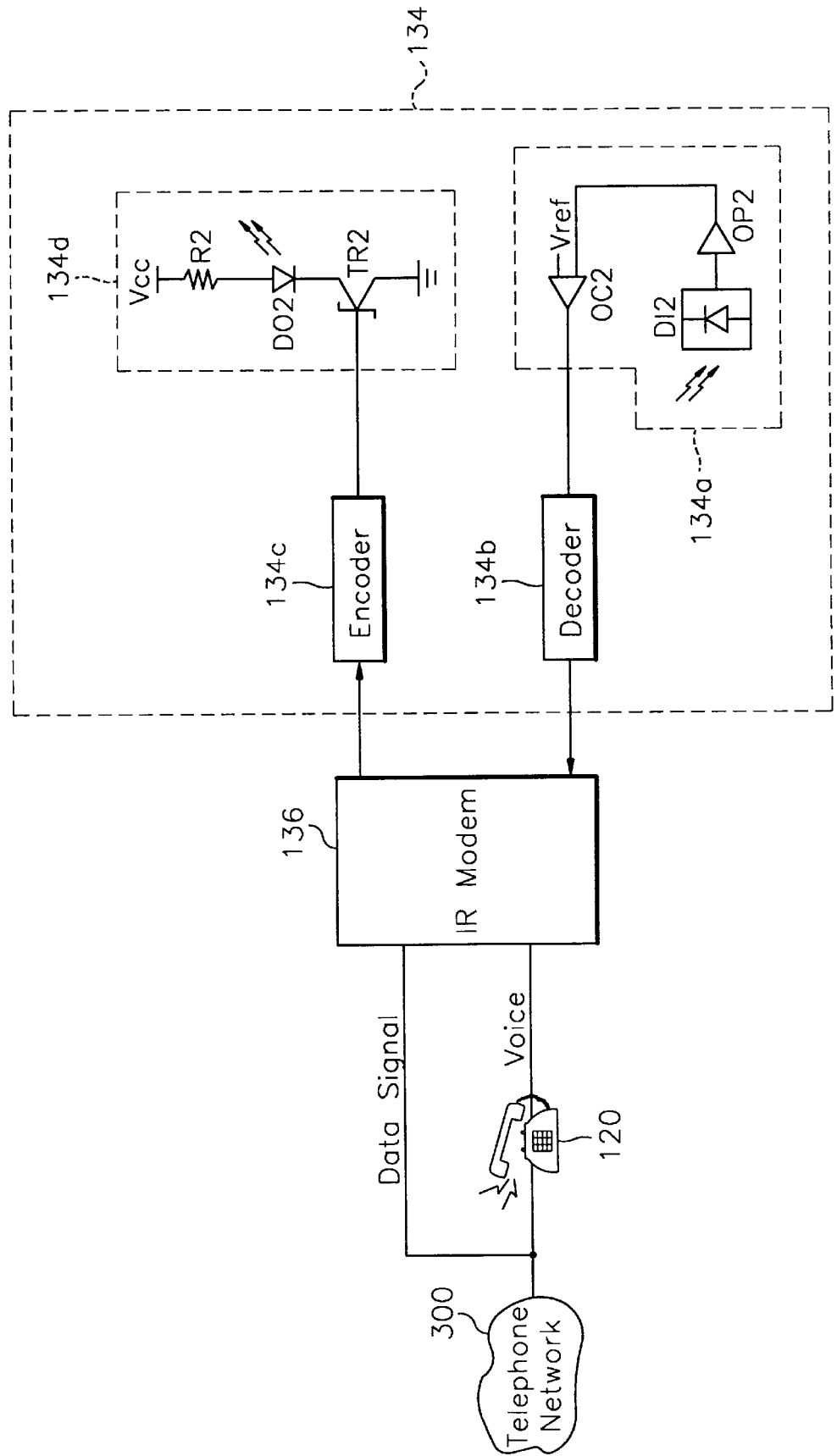

With reference to FIGS. 5, the output driver 116b has serially connected elements, for example, a resistor R1, an infrared emitting diode DO1 and a driving transistor TR1, disposed between a power source Vcc and a ground. When the transistor TR1 is activated by the analog signal from the encoder 116a, an infrared signal is emitted from the diode DO1. Also, the input driver 116c has an infrared receiving diode DI1, an amplifier OP1 and a comparator OC1 consisting of an operational amplifier. If the infrared signal emitted from the output driver 116b is supplied to the input driver 116c, the infrared signal is transformed into an electrical signal by means of the infrared receiving diode DI1. This signal is amplified by the amplifier OP1, and then the signal amplified signal is compared with a reference signal $V_{ref}$ by means of the comparator OC1. As a result, the decoder 116d decodes the comparison result and transforms it into a specific form necessary for data demodulation. The output driver 134d shown in FIG. 6 has the same circuit construction as the output driver 116b shown in FIG. 5 and the input driver 134a shown in FIG. 6 has the same circuit construction as the input driver 116c shown in FIG. 5.

Figure 7:
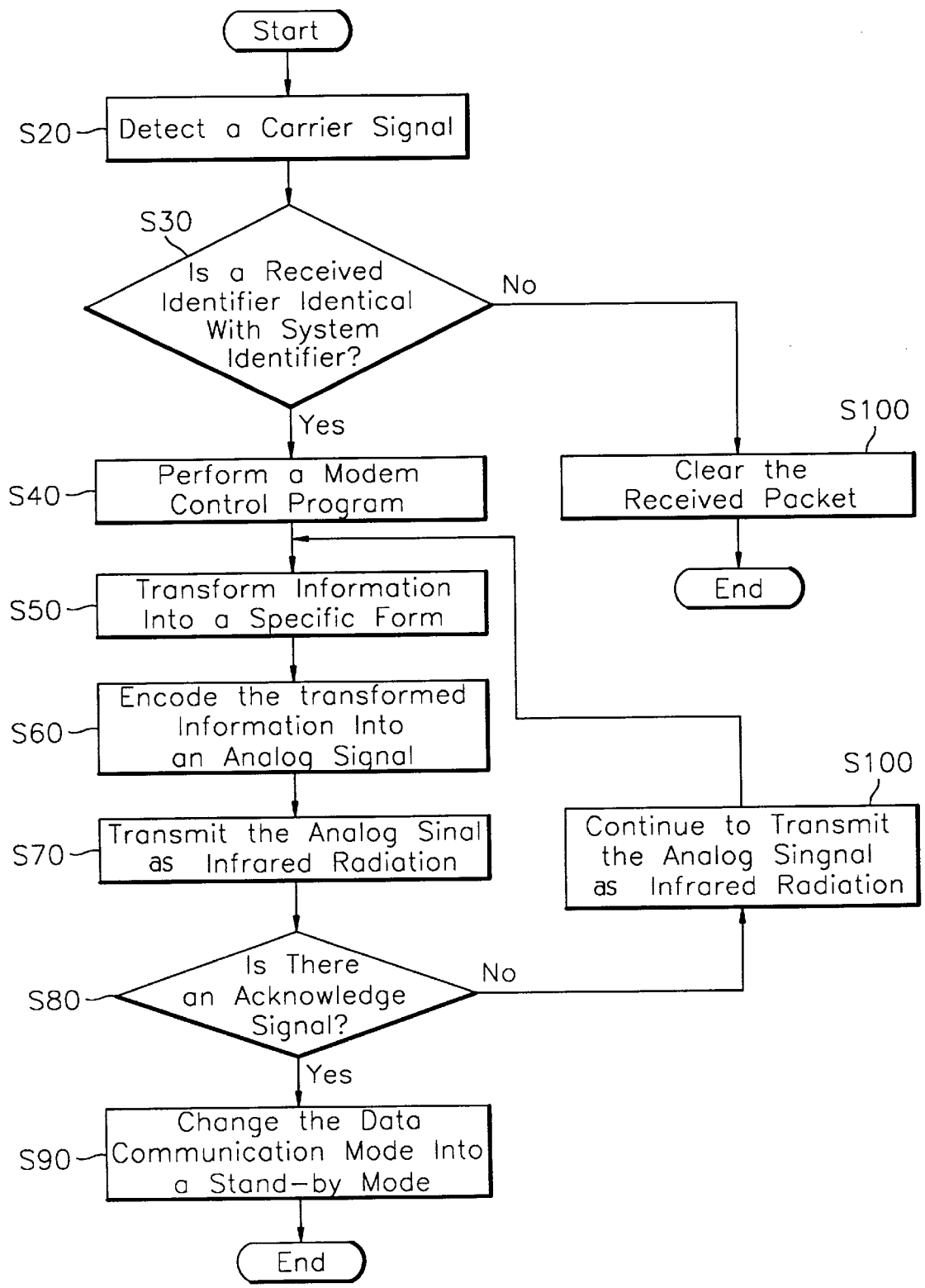
FIG. 7 is a flowchart illustrating the control steps of the wire/wireless communication system shown in FIG. 1.

The operation of the wire/wireless communication system according to the present invention will be hereinafter described in detail with reference to FIG. 7. The program (shown in FIG. 7) of controlling the system operation is performed in the computer terminal 100.

At step S20, after the computer terminal 100 detects a carrier signal which is provided through the transceiver 110, the control proceeds to step S30, wherein the computer terminal 100 determines whether an identifier of a data packet from a remote computer terminal 200, which is far away from the computer terminal 100, is identical with the identifier of the computer system 100.

If so, the control proceeds to step S40, wherein the IR baseband modem 114 is operated in accordance with a modem control program, which is stored in the memory 114b, in response to the control signal from the remote computer terminal 200. At step S50, the modem 114 performing the control program modulates information into a specific form required by the computer terminal 200 to generate a modulated signal, and then the control proceeds to step S60. Herein, the information modulated into the specific form is transformed into an analog signal necessary for infrared radiation and the control proceeds step S70. At step S70, the analog signal from the encoder 116a is transmitted as infrared radiation by means of the infrared emitting diode TR1, and then the control proceeds to step S80, wherein the computer terminal 100 determines whether or not an acknowledge signal has been provided from the remote computer terminal 200.

If so, the control proceeds to step S90, wherein the computer terminal 100 recognizes that there is no communication error during the information transmission from the computer terminal 100 to the remote computer terminal 200. The computer terminal 100 is then changed into a standby mode to detect a control signal from the remote computer terminal 200, other computer terminals, computer peripherals, home automation equipment or the like. If not, the control proceeds to step S100, wherein the computer terminal 100 continues to transmit the analog signal as infrared radiation, and the control jumps to step S50.

On the other hand, at step S30, if the identifier of a data packet from the remote computer terminal 200 is not identical with the identifier of the computer system 100, the control proceeds to step S100 wherein the received data packet is cleared. The computer terminal 100 is then operated in the standby mode.

As describe above, a wire/wireless communication system can transmit information using a telephone network between two locations which are positioned far away from each other. With the system, wireless communication between a data transmitting unit and a telephone, which are positioned at a first location, may be accomplished by transceivers coupled respectively to them, and wire communication between the telephone and a remote telephone positioned at a second location far away from the first location may be accomplished by a telephone network. Also wireless communication between the remote telephone and a data receiving unit may be accomplished by transceivers respectively coupled to them. Accordingly, the wire/wireless communication system of the present invention permits long-distance communication to be accomplished between two terminals which are far away.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A system for wire/wireless communication of information using a telephone network disposed between two locations which are disposed away from each other, comprising:
    a data transmitting unit positioned at a first of said two locations, for transmitting information;
    a first transceiver, positioned at said first location, and coupled to said data transmitting unit, for transforming said information into a first infrared signal;
    a first telephone positioned at said first location;
    a second transceiver, positioned at said first location, and coupled to said first telephone, for receiving said first infrared signal from said first transceiver and for transforming said first infrared signal into an electrical signal to be supplied to said telephone network;

a second telephone positioned at a second of said two locations and connected to said telephone network;

a third transceiver, positioned at said second location, and coupled to said second telephone, for receiving said electrical signal over a telephone line of said telephone network and for transforming said electrical signal into a second infrared signal;

a fourth transceiver, positioned at said second location, and for receiving said second infrared signal and for transforming said second infrared signal into said electrical signal; and a data receiving unit, positioned at said second location, and coupled to said fourth transceiver, for receiving said electrical signal and transforming said information;

a detector for detecting a carrier signal which is provided through said first transceiver to said data transmitting unit;

a means for determining whether a first identifier of a data packet from said data receiving unit is identical with a second identifier of said data transmitting unit and if so, performing a modem control program in said first transceiver in response to a control signal from said data receiving unit;

a data transformer for transforming said information from said data transmitting unit into a specific form required by said data receiving unit to generate a transformed signal;

an encoder for encoding said transformed signal into an analog signal necessary for infrared radiation;

an infrared transmitter for transmitting said analog signal as infrared radiation; and a means for determining whether an acknowledge signal is provided from said data receiving unit and if so, changing a data communication mode into a standby mode to detect a control signal from said data receiving unit, or, if not, continuously transmitting said analog signal as infrared radiation; and clearing said received data packet, if said identifier of a data packet from said data receiving unit is not identical with said identifier of said data transmitting unit.

2. The system according to claim 1, each of said data transmitting and receiving units comprising a computer terminal.

3. The system according to claim 1, said data transmitting unit comprising a computer terminal and said data receiving unit comprising one of an office automation device and computer peripheral equipment.

4. The system according to claim 1, each of said first and third transceivers comprising:

a first infrared baseband modem for transforming said information into an analog form necessary for telephone line transmission;

a transmitter for transforming an analog signal from said first infrared baseband modem into an infrared signal; and a first infrared antenna for transmitting said infrared signal as infrared radiation.

5. The system according to claim 4, said first infrared baseband modem comprising a first memory having a plurality of data transmitting control programs stored therein.

6. The system according to claim 4, said transmitter comprising an encoder for transforming said analog signal into a specific form, and an output driver for receiving said analog signal encoded into said specific form and for generating said infrared signal.

7. The system according to claim 1, each of said second and fourth transceivers comprising:

a second infrared antenna for transforming said infrared radiation into said infrared signal;

a receiver for receiving and converting said infrared signal into said analog signal; and a second infrared baseband modem for receiving and converting said analog signal into said analog form necessary for telephone line transmission.

8. The system according to claim 7, said second infrared baseband modem comprising a second memory having a plurality of data receiving control programs stored therein.

9. The system according to claim 7, said receiver comprising an input driver for receiving said infrared signal and transforming said infrared signal into said analog signal, and a decoder for transforming said analog signal into a specific form.

10. The system according to claim 6, said output driver comprising a bias resistor connected to a power source, an infrared emitting diode connected in series with said bias resistor, and a driving transistor for driving said diode in response to said analog signal from said encoder.

11. The system according to claim 9, said input driver comprising an infrared receiving diode for transforming said infrared signal into an electrical signal, and a comparator for comparing said electrical signal with a reference signal to provide a comparison result to said decoder.

12. A control method of a system for wire/wireless communication of information using a telephone network disposed between two locations which are away from each other, comprising the steps of providing a data transmitting unit positioned at a first of said two locations, for transmitting information;

providing a first transceiver, positioned at said first location, and coupled to said data transmitting unit, for transforming said information into a first infrared signal;

providing a first telephone positioned at said first location;

providing a second transceiver, positioned at said first location, and coupled to said first telephone, for receiving said first infrared signal from said first transceiver and for transforming said first infrared signal into an electrical signal to be supplied to said telephone network;

providing a second telephone positioned at a second of said two locations and connected to said telephone network;

providing a third transceiver, positioned at said second location, and coupled to said second telephone, for receiving said electrical signal over a telephone line of said telephone network and for transforming said electrical signal into a second infrared signal;

providing a fourth transceiver, positioned at said second location, and for receiving said second infrared signal and for transforming said second infrared signal into said electrical signal; and providing a data receiving unit, positioned at said second location, and coupled with said fourth transceiver, for receiving said electrical signal and transforming said information;

detecting a carrier signal which is provided through said first transceiver to said data transmitting unit;

determining whether a first identifier of a data packet from said data receiving unit is identical with a second identifier of said data transmitting unit;

if so, performing a modem control program in said first transceiver in response to a control signal from said data receiving unit;

transforming said information from said data transmitting unit into a specific form required by said data receiving unit to generate a transformed signal;

encoding said transformed signal into an analog signal necessary for infrared radiation;

transmitting said analog signal as infrared radiation;

determining whether an acknowledge signal is provided from said data receiving unit;

if so, changing a data communication mode into a standby mode to detect a control signal from said data receiving unit, or, if not, continuously transmitting said analog signal as infrared radiation; and clearing said received data packet, if said identifier of a data packet from said data receiving unit is not identical with said identifier of said data transmitting unit.

13. A system for wire/wireless communication of information using a telephone network between two locations, comprising:

a computer system positioned at a first of said two locations and having a first transceiver for transforming information from said computer system into a first infrared signal;

a first telephone having a second transceiver for transforming said first infrared signal into an electrical signal to be applied to said telephone network;

a second telephone positioned at a second of said two locations and having a third transceiver for transforming said electrical signal into a second infrared signal; and an electrical product having a fourth transceiver for transforming said second infrared signal into an electrical control signal to be controlled in response to said electrical control signal;

a detector for detecting a carrier signal which is provided through said first transceiver to a data transmitting unit of said first transceiver;

a means for determining whether a first identifier of a data packet from said data receiving unit is identical with a second identifier of said data transmitting unit and if so, performing a modem control program in said first transceiver in response to a control signal from a data receiving unit of said fourth transceiver a data transformer for transforming said information from said data transmitting unit into a specific form required by said data receiving unit to generate a transformed signal;

an encoder for encoding said transformed signal into a analog signal necessary for infrared radiation;

an infrared transmitter of said first transceiver for transmitting said analog signal as infrared radiation;

a means for determining whether an acknowledge signal is provided from said data receiving unit and if so, changing a data communication mode into a standby mode to detect a control signal from said data receiving unit, or, if not, continuously transmitting said analog signal as infrared radiation; and clearing said received data packet, if said identifier of a data packet from said data receiving unit is not identical with said identifier of said data transmitting unit.

14. The system according to claim 13, each of said first and third transceivers comprising:

a first infrared baseband modem for transforming said information into an analog form necessary for telephone line transmission;

a transmitter means for transforming an analog signal from said first infrared baseband modem into an infrared signal; and a first infrared antenna for transmitting said infrared signal as infrared radiation.

15. The system according to claim 14, said first infrared baseband modem comprising a first memory having a plurality of data transmitting control programs stored therein.

16. The system according to claim 14, said transmitter means comprising an encoder for transforming said analog signal into a specific form, and an output driver for receiving said analog signal encoded into said specific form and for generating said infrared signal.

17. The system according to claim 13, each of said second and fourth transceivers comprising:

a second infrared antenna for transforming said infrared radiation into said infrared signal;

a receiver means for receiving and converting said infrared signal into said analog signal; and a second infrared baseband modem for receiving and converting said analog signal into said analog form necessary for telephone line transmission.

* * * * *